United States Patent [19]
Ueno et al.

[11] Patent Number: 5,585,814
[45] Date of Patent: Dec. 17, 1996

[54] RESETTING CIRCUIT AND APPARATUS UTILIZING THE SAME

[75] Inventors: Isamu Ueno, Hadano; Tetsunobu Kohchi, Hiratsuka, both of Japan

[73] Assignee: Canon Kabushiki Kaisha, Tokyo, Japan

[21] Appl. No.: 479,858

[22] Filed: Jun. 7, 1995

Related U.S. Application Data

[63] Continuation of Ser. No. 400,523, Mar. 7, 1995, abandoned, which is a continuation of Ser. No. 972,432, Nov. 5, 1992, abandoned.

[30] Foreign Application Priority Data

Nov. 8, 1991 [JP] Japan .................................. 3-319698

[51] Int. Cl.$^6$ ..................................................... G09G 3/36
[52] U.S. Cl. ................................. 345/90; 345/94
[58] Field of Search ................................ 345/90, 92, 94, 345/99

[56] References Cited

U.S. PATENT DOCUMENTS

| | | | |
|---|---|---|---|
| 4,158,786 | 6/1979 | Hirasawa | 359/85 X |
| 4,810,059 | 3/1989 | Kuijk | 359/57 |
| 5,014,048 | 5/1991 | Knapp | 340/784 |
| 5,159,326 | 10/1992 | Yamazaki et al. | 359/85 X |

*Primary Examiner*—Ulysses Weldon
*Attorney, Agent, or Firm*—Fitzpatrick, Cella, Harper & Scinto

[57] ABSTRACT

A resetting circuit for a device including a plurality of cells adapted to be reset, the resetting circuit including a reference voltage source for providing a reference voltage, connecting paths for connecting the cells to the reference voltage source for resetting the cells, and altering means for altering during a resetting period, an impedance of the connecting paths to an impedance of lower value.

13 Claims, 11 Drawing Sheets

RESETTING CIRCUIT AND APPARATUS UTILIZING THE SAME

This application is a continuation of application Ser. No. 08/400,523, filed Mar. 7, 1995, now abandoned, which is a continuation of application Ser. No. 07/972,432, filed Nov. 5, 1992, now abandoned.

BACKGROUND OF THE INVENTION

1. Field of the Invention

The present invention relates to a resetting circuit adapted for use in an optical information processing apparatus such as a facsimile apparatus, a video cassette recorder or the like.

2. Related Background Art

FIG. 1 is a circuit diagram of a photoelectric converting device including resetting circuits, as an example of the conventional resetting circuit; FIG. 2 is a circuit diagram of one of pixels $S_{11}$, $S_{12}$, . . . shown in FIG. 1; and FIG. 3 is a timing chart showing the function of said circuit.

In the conventional example shown in FIG. 1, pixels $S_{11}$, $S_{12}$ . . . $S_{21}$, $S_{22}$, . . . , each containing a bipolar transistor, are arranged two-dimensionally, wherein said pixels are connected, in respective rows, to the driving lines $\phi_{V1}$, $\phi_{V2}$, . . . of a vertical scanning circuit, while the output terminals of said pixels are connected, in respective columns, to output lines $H_1$, $H_2$, . . .

The output lines $H_1$, $H_2$, . . . are respectively connected to MOS transistors $M_{11}$, $M_{12}$, . . . constituting resetting switch means and MOS transistors $M_{21}$, $M_{22}$, . . . for signal transfer.

Other terminals of said resetting MOS transistors, not connected to said output lines, are connected to a resetting reference voltage source $V_{VC}$, and the gates of said MOS transistors are controlled by clock signals $\phi_{VC}$.

The output terminals of the signal transfer MOS transistors are respectively connected to accumulating capacitors $C_1$, $C_2$, . . . and further to MOS transistors $M_{31}$, $M_{32}$, . . . which are driven in succession by a horizontal scanning circuit. Other terminals of said MOS transistors $M_{31}$, $M_{32}$, . . . are connected to a common output line.

Each of the pixels $S_{11}$, . . . is composed, as shown in FIG. 2, of a phototransistor $Q_1$, a capacitor $C_{OX}$ connected between the base of said phototransistor $Q_1$ and the line $\phi_V$ for controlling the base potential of the transistor $Q_1$, a PMOS transistor $M_{BR}$ for resetting the base of the transistor $Q_1$, a resetting variable voltage source $V_{BR}$, and a collector power source $V_{cc}$ for the transistor $Q_1$.

The transistor $Q_1$ is connected, at the collector thereof, with $V_{cc}$, also at the emitter with the output line H, and at the base with a terminal of the capacitor $C_{OX}$ and a terminal of the PMOS transistor $M_{BR}$. The other terminal of the capacitor $C_{OX}$ and the gate of the PMOS transistor $M_{BR}$ are connected to the line $\phi_V$, while the other terminal of the PMOS transistor $M_{BR}$ is connected to the variable voltage source $V_{BR}$.

In the following there will be explained the functions of components with reference to a timing chart shown in FIG. 30 wherein the base potential and the emitter potential are those of the phototransistor $Q_1$. $V_{BRH}$ means a high-level voltage of the variable voltage source $V_{BR}$, generally a voltage of about +3 V, while $V_{BRL}$ is a low-level voltage of the variable voltage source $V_{BR}$, which has to be lower than the threshold value of the PMOS transistor $M_{BR}$ for the functions of the circuit and is generally about ±0 V.

At first, at a timing $t_1$, the PMOS transistor $M_{BR}$ is turned on to reset the base of the transistor $Q_1$ to $V_{BRH}$. The potential of the emitter of said transistor $Q_1$, being in a floating state, is elevated following the base potential.

Then, at a timing $t_2$, the transistors $M_{11}$, $M_{12}$, . . . are turned on by the block signal $\phi_{VC}$, then the PMOS transistors $M_{BR}$ are turned off by an elevation of the potential $\phi_V$, and the base potential is elevated by the capacitative coupling of the capacitors $C_{OX}$ to maintain the phototransistors of the pixels in a forward biased state, whereby the pixels are reset by the emitter-follower operation.

Then, at a timing $t_3$, the potential $\phi_V$ is reduced to lower the base potential by the capacitative coupling of $C_{OX}$, thereby maintaining the phototransistor in an inverse biased state. In this state, the voltage of the variable voltage source is reduced to $V_{BRL}$, so that the resetting need not be repeated again by the turning-on of the PMOS transistor.

When light enters the base of the phototransistor $Q_1$ of which the base-emitter junction and the base-collector junction are both inversely biased, photocarriers are generated and are accumulated on a capacitance associated with the base, thereby elevating the base potential from the reset level. The amount of elevation of the base potential, proportional to the amount of light, can be read out in an output line H connected to the emitter by an emitter-follower operation, by elevating the base potential at a timing $t_4$ to establish again a forward bias state between the base and the emitter.

In the above-explained conventional method, the resetting operation is conducted in order to obtain a uniform initial potential in the transistors, prior to the start of charge accumulation at the timing $t_3$, and the sum of the emitter currents flowing from the phototransistors into the resetting power source $V_{VC}$ at this operation assumes a differentiated form, as shown in FIG. 4, having a peak immediately after the start of the resetting operation. Consequently the peak current becomes larger with the increase in the number of the pixels to be simultaneously reset, leading to drawbacks such as an increased load of the external power source and a fluctuation in the power supply voltage eventually triggering a latch-up.

In order to cope with said drawbacks, the present inventors tried an increased on-resistance by varying the size of the resetting MOS transistor. This method could suppress the peak current, but resulted in another drawback of a prolonged time required for resetting operation.

The solution to the above-mentioned technical difficulties is vital for the increase in the number of pixels and for the high speed drive which are apparently the future direction of the photosensors.

SUMMARY OF THE INVENTION

An object of the present invention is to provide a resetting circuit enabling to obtain a signal with limited noises, and an apparatus utilizing the same.

Another object of the present invention is to provide a resetting circuit of a low electric power consumption, capable of reducing the peak current generated at the resetting operation of pixels, and an apparatus utilizing the same.

Still another object of the present invention is to provide a resetting circuit which constitutes a reduced load to the external power source, thus giving little influence to the power supply voltage, and an apparatus utilizing the same.

Still another object of the present invention is to provide a resetting circuit capable of suppressing the peak current at the resetting operation, by varying the impedance of the reset line at the resetting operation.

DETAILED DESCRIPTION OF THE PREFERRED EMBODIMENTS

The present invention provides an improvement in the resetting means for resetting the potential of pixels in a photoelectric converting device or an image display device.

In a preferred embodiment, the resetting means of the present invention is provided with means, in connecting the pixel with a resetting reference voltage source through a current path, for varying the impedance of said current path, or more precisely, means for varying the resistance of said current path from a relatively high value $R_H$ to a relatively low value $R_L$.

Said varying means can be switch means for varying the resistance in two levels from a higher value $R_H$ to a lower value $R_L$, or switch means for varying the resistance in a larger number of levels from the higher value $R_H$ to the lower value through at least an intermediate value $R_M$, or a variable resistor continuously variable from the higher value $R_H$ to the lower value $R_L$.

The above-mentioned resistance values and timing of variation are suitably selected according to the design of the entire device, and said resistance values are so selected as to satisfy a relation:

$$R_H > R_M > R_L.$$

Said varying means is composed, utilizing a known bipolar transistor, or a known unipolar transistor such as a gate insulated field effect transistor, a junction gate field effect transistor or a static induction transistor, or a variable resistor, either singly or using a combination of plurality of these devices.

Also the pixel of the photoelectric converting device of the present invention can be composed, as already known, of a diode, a phototransistor such as a bipolar transistor, a junction gate field effect transistor, or a static induction transistor, and, in the resetting operation, a forward bias is applied between the anode and the cathode, or between the control electrode area (base or gate) of the transistor and one of the main electrode areas (emitter, collector, source or drain).

In case of the image display device, the pixel thereof is composed of an active matrix liquid crystal pixel or a simple matrix liquid crystal pixel.

The structure and signal reading method of the above-mentioned pixel are described in detail, for example in the U.S. Pat. No. 4,791,469 granted to inventors Ohmi and Tanaka for a photoelectric converter and in the U.S. Pat. No. 4,810,896 granted to inventors Nakamura et al. for a photoelectric conversion device with reduced fixed pattern noises.

In the following the present invention will be clarified in detail by embodiments thereof applied to a photoelectric converting device, but it is to be understood that the present invention is likewise applicable directly to an image display device by replacing each pixel with a liquid crystal pixel.

Embodiment 1

Figure 1:
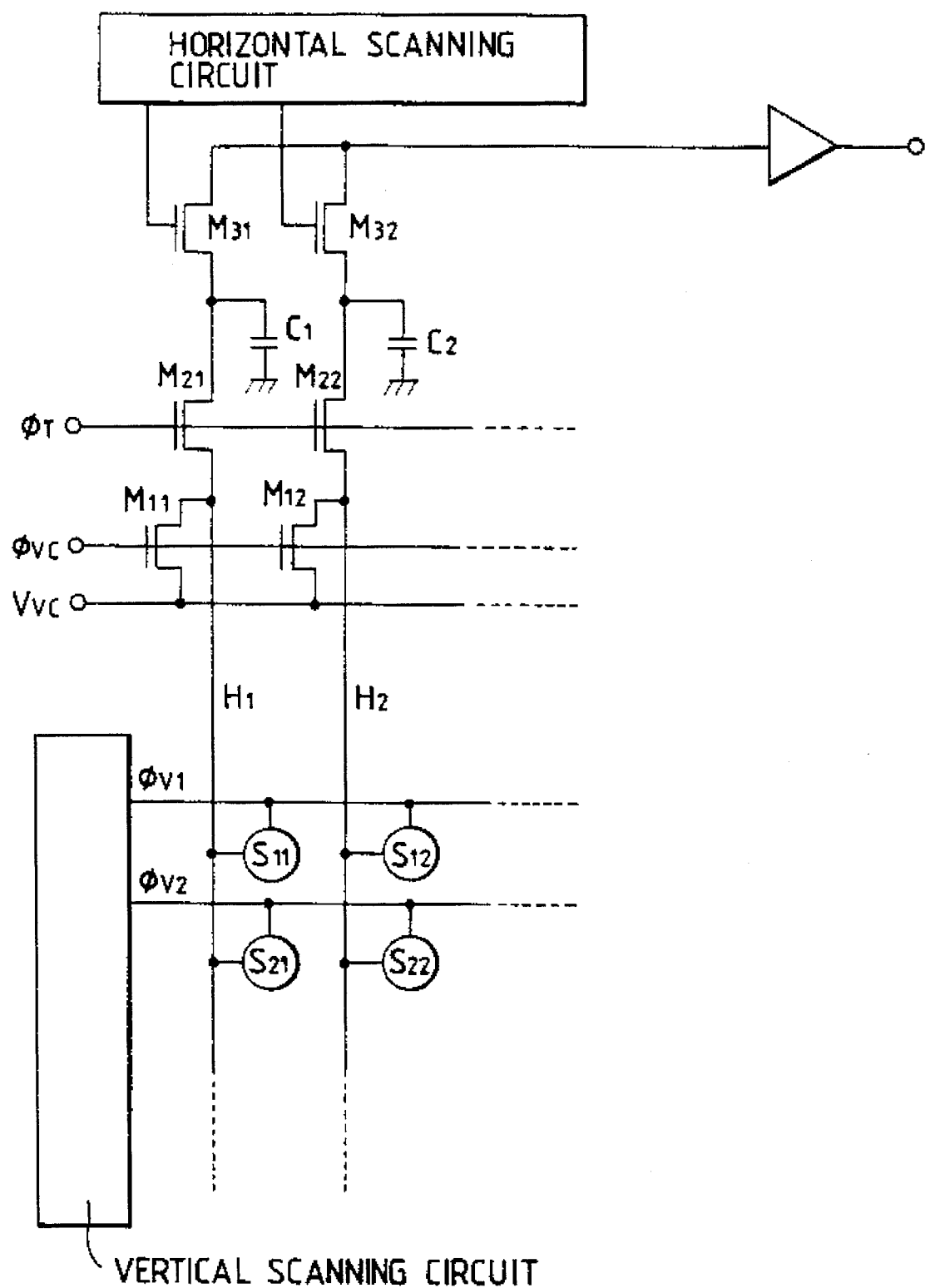
FIG. 1 is a circuit diagram of a conventional photoelectric converting device.
Figure 2:
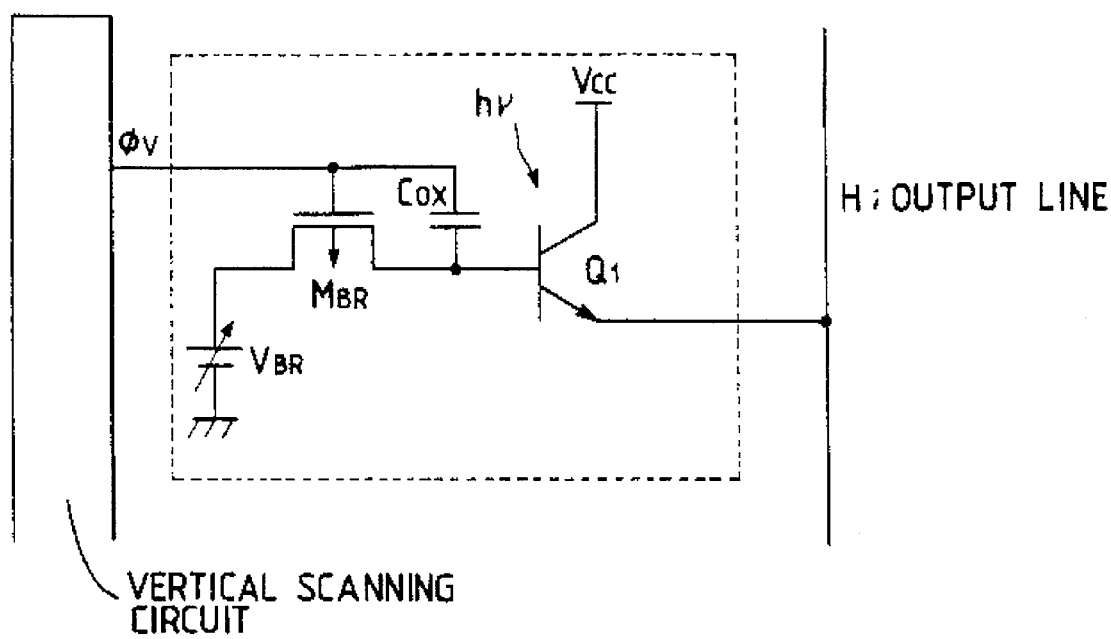
FIG. 2 is a circuit diagram of a pixel of the device shown in FIG. 1.
Figure 4:
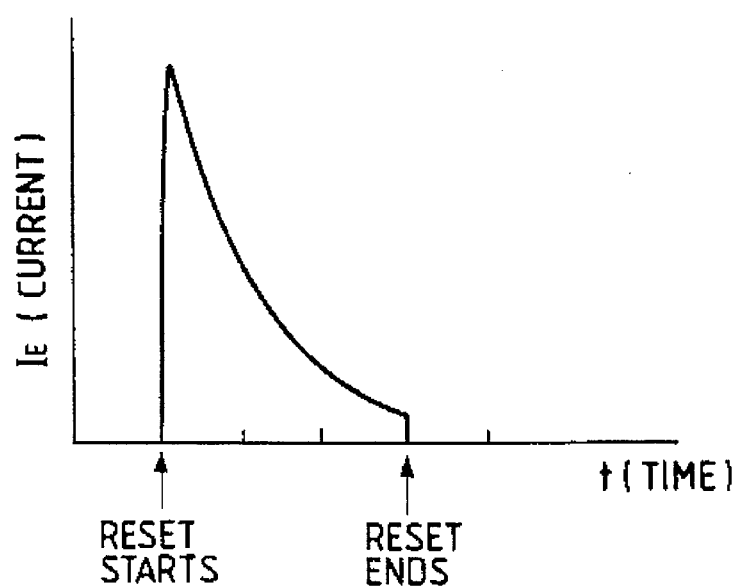
FIG. 4 is a chart showing the resetting current in a conventional circuit.
Figure 3:
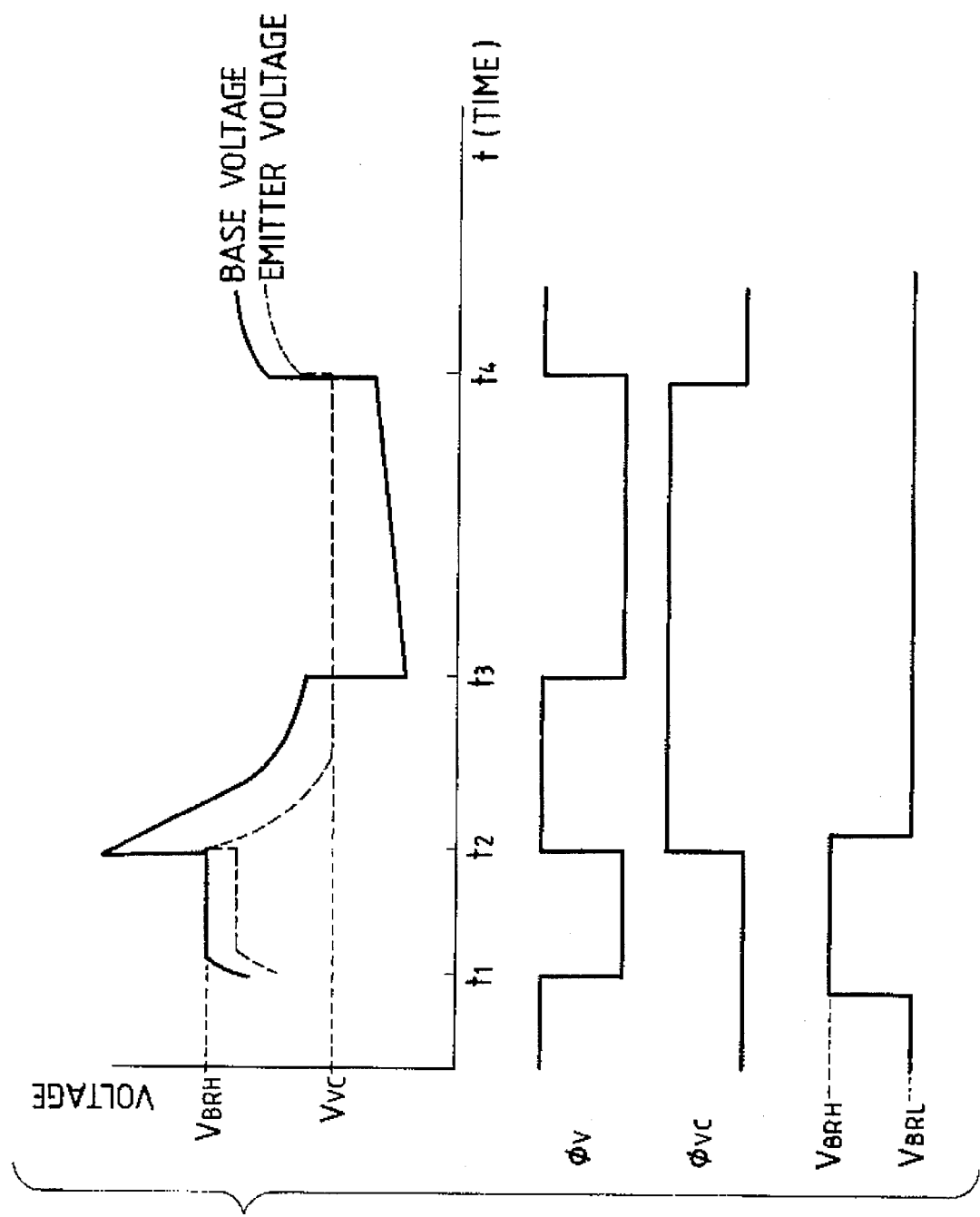
FIG. 3 is a timing chart showing the function of the device shown in FIG. 1.
Figure 5:
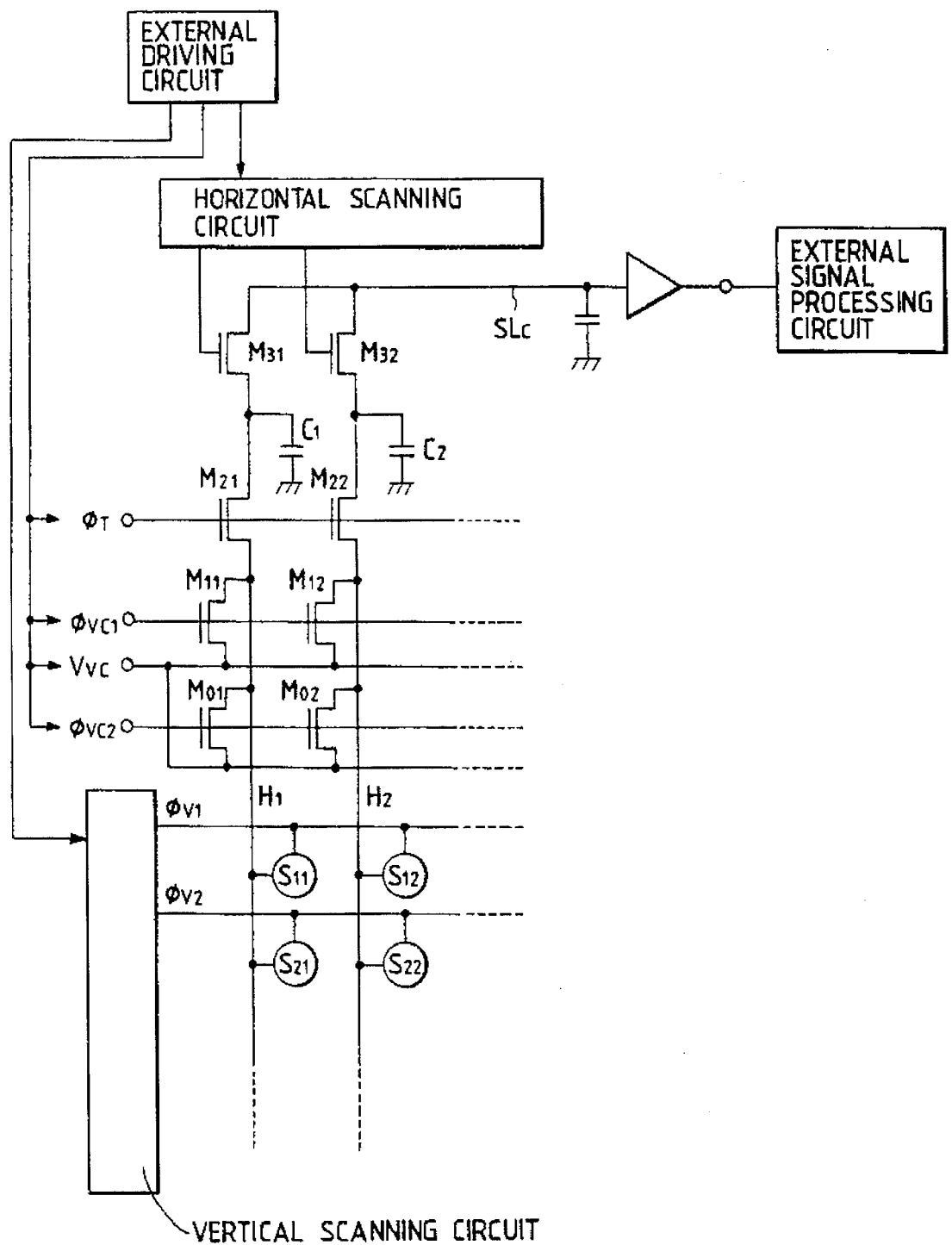
FIG. 5 is a circuit diagram of a device constituting a first embodiment of the present invention.
Figure 6:
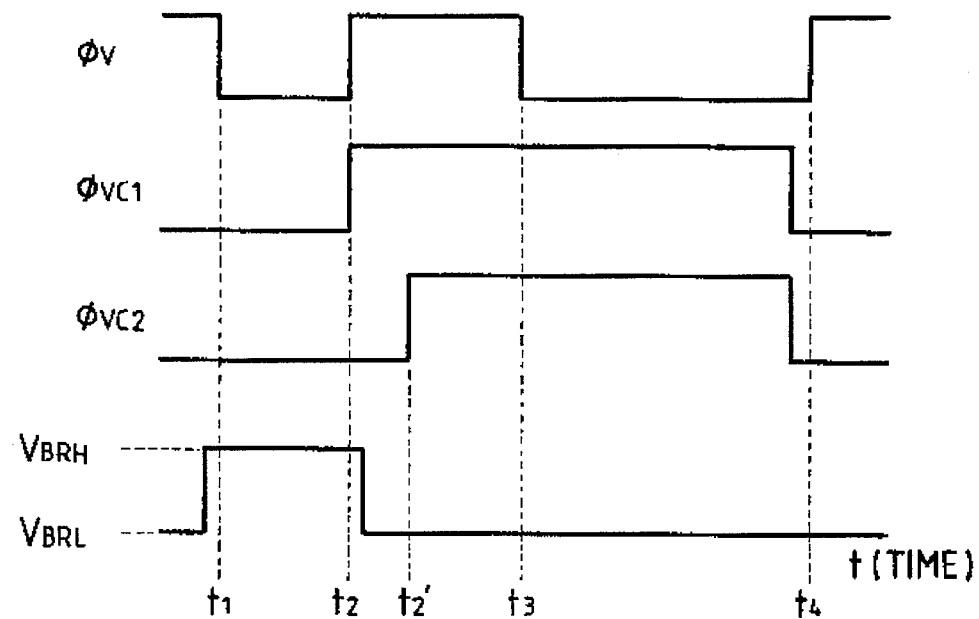
FIG. 6 is a timing chart showing the function of the device of the first embodiment of the present invention.

FIG. 5 is a circuit diagram of a first embodiment of the present invention, and FIG. 6 is a timing chart showing the function of said first embodiment.

Referring to FIG. 5, resetting MOS transistors $M_{01}$, $M_{02}$, ... function similarly to MOS transistors $M_{11}$, $M_{12}$, ... and one of terminals of each of said transistors is connected to an output line H while the other terminal is connected to a variable voltage source $V_{VC}$. The gates of the MOS transistors $M_{11}$, $M_{12}$, ... are controlled by a clock signal $\phi_{VC1}$ while those of the MOS transistors $M_{01}$, $M_{02}$, ... are independently controlled by a clock signal $\phi_{VC2}$.

The size of said transistors $M_{01}$, $M_{02}$, ..., $M_{11}$, $M_{12}$, ... is so selected that the on-resistance of each of said transistors is larger than that of the resetting MOS transistor in the conventional structure explained before and that, when the transistors $M_{01}$ and $M_{11}$, $M_{02}$, and $M_{12}$, ... are both turned on, the parallel on-resistance of thus paired transistors becomes smaller than the on-resistance of the resetting MOS transistor in the conventional configuration.

For example, in a conventional area sensor utilizing bipolar transistors, there is employed a resetting MOS transistor with a channel length of 2.5 µm and a channel width of 50 µm for resetting 970 phototransistors connected to an output line within a resetting time of 200 µs. In the present embodiment, there are provided two resetting MOS transistors with a channel length of 2.5 µm and a channel width of 30 µm, which are connected in parallel and of which gates are controlled by independent clock signals.

In the following there will be explained the function of the component units, with reference to a timing chart shown in FIG. 6. At first, as in the conventional circuit, the base of the phototransistor $Q_1$ is maintained at a potential $V_{BRH}$ at a timing $t_1$, Then, at a timing $t_2$, the resetting MOS transistors $M_{11}$, $M_{12}$, ... are turned on by the clock signal $\phi_{VC1}$, and the potential $\phi_V$ is elevated to bias the phototransistors of the pixels in the forward direction, whereby the transient resetting of the pixels is initiated by the emitter-follower operation.

In this operation, the emitter current of the phototransistors flowing into the resetting reference voltage source $V_{VC}$ is governed by the on-resistances of the resetting MOS transistors $M_{11}$, $M_{12}$, ... and the peak current at the initial stage of resetting is suppressed, corresponding to the increase in the on-resistances.

Then, at a timing $t_2'$, the resetting MOS transistors $M_{01}$, $M_{02}$, ... are turned on by the clock signal $\phi_{VC2}$, whereby the on-resistances of the resetting MOS transistors are effectively reduced and the resetting can be sufficiently achieved.

Subsequently the accumulation of photocarriers is initiated at a timing $t_3$, and the read-out operation, for reading the signals in the capacitances $C_1$, $C_2$ of the output line H, is initiated at a timing $t_4$.

Figure 7:
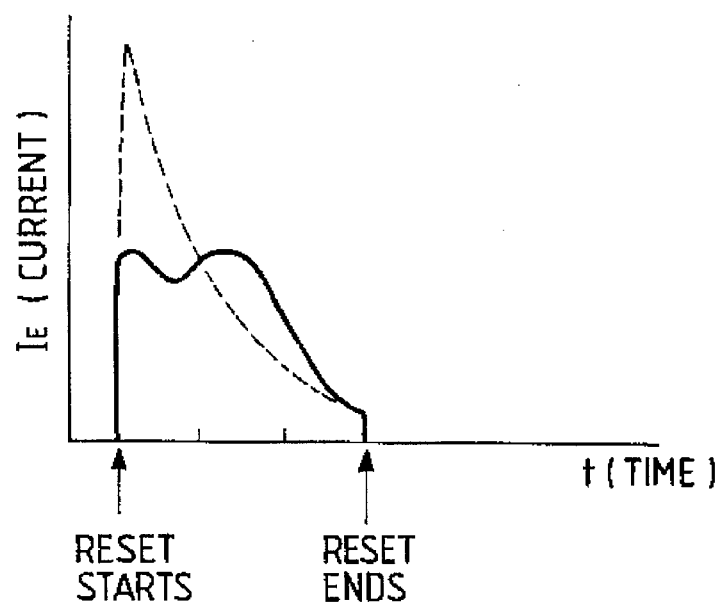
FIG. 7 is a chart showing the resetting circuit.

As explained in the foregoing, it is rendered possible to suppress the peak current immediately after the start of resetting as shown in FIG. 7 and to still achieve sufficient resetting within a limited time, by providing plural resetting MOS transistors on a resetting current path and by mutually displacing the on-off timings of said transistors.

In the above-explained embodiment there are employed two resetting MOS transistors in each resetting current path, but similar effects can naturally be attained by employing three or more resetting MOS transistors.

The functions of such resetting MOS transistors $M_{11}$, $M_{12}$, ... $M_{01}$, $M_{02}$, ... and those of the vertical and horizontal scanning circuits are controlled by an external driving circuit. Also the time-sequential signal released from the common output signal line SLc is processed by an external signal processing circuit. Such external circuits are normally composed of one or plural semiconductor integrated circuits.

Embodiment 2

Figure 8:
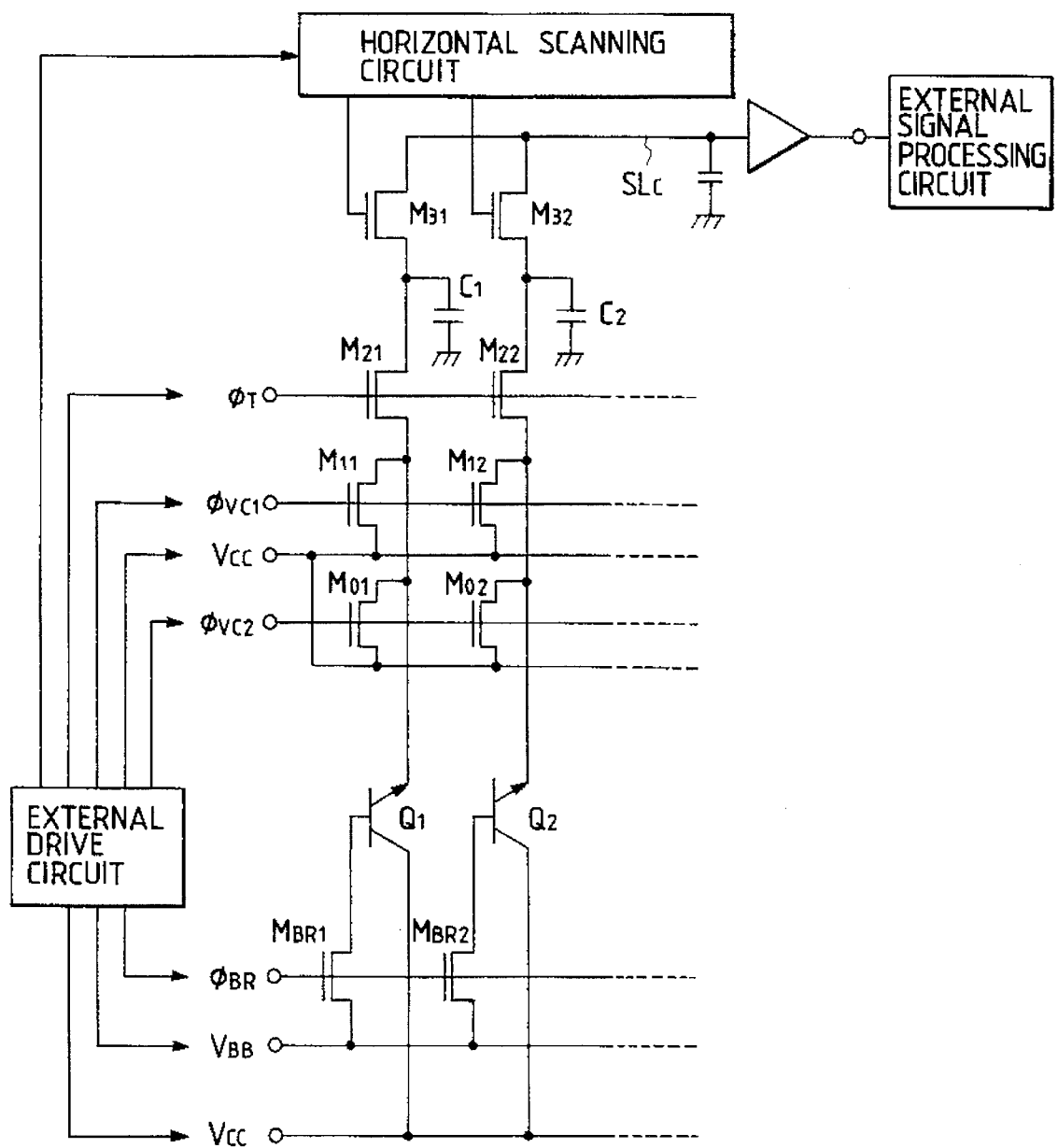
FIG. 8 is a circuit diagram of a device constituting a second embodiment of the present invention.
Figure 9:
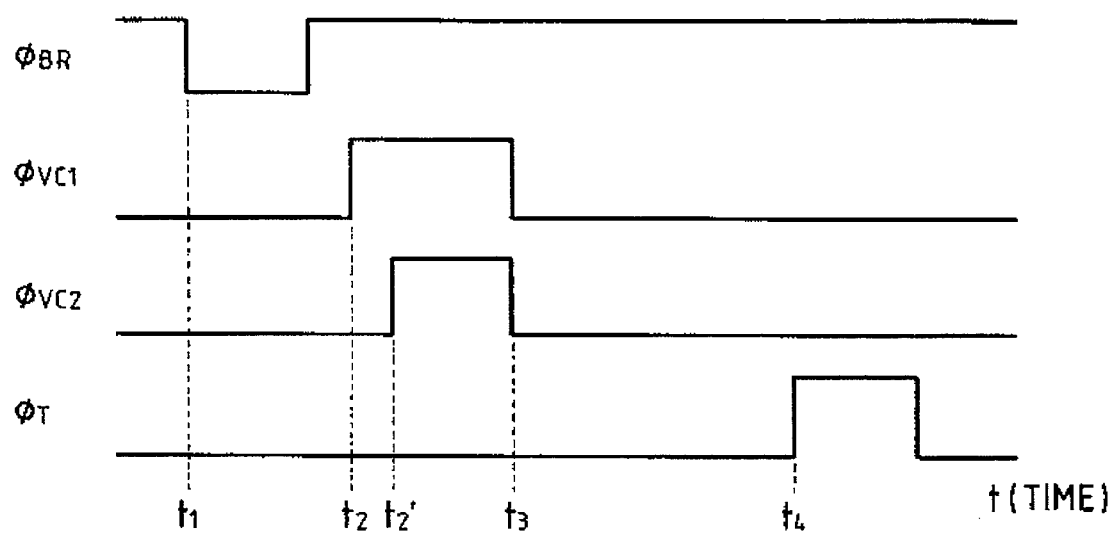
FIG. 9 is a timing chart showing the function of the device of the second embodiment.

FIG. 8 is a circuit diagram of a second embodiment, in which the present invention is applied to a linear sensor, and FIG. 9 is a timing chart showing the function of said circuit.

A clock signal $\phi_{BR}$ drives the gates of the base resetting PMOS transistors $M_{BR1}$, $M_{BR2}$, ... for the phototransistors $Q_1$, $Q_2$, ... A reference voltage source $V_{BB}$ is provided for base resetting.

Now reference is made to FIG. 9 for explaining the functions of various components. Under the control of an external driving circuit, the resetting PMOS transistors $M_{BR1}$, $M_{BR2}$, ... are turned on at a timing $t_1$ to reset the bases of the phototransistors $Q_1$, $Q_2$, ... to a potential given by $V_{BB}$.

The potential of the emitters of said transistors $Q_1$, $Q_2$ ..., being in a floating state, is elevated, following the base potential.

Then, at a timing $t_2$, the clock signal $\phi_{VC1}$ turns on the transistors $M_{11}$, $M_{12}$, ... to establish a forward biased state between the base and the emitter of the phototransistor of each pixel, thereby initiating the resetting operation by the emitter-follower function.

Subsequently, at a timing $t_2'$, the clock signal $\phi_{VC2}$ turns on the resetting MOS transistors $M_{01}$, $M_{02}$, ..., thereby attaining sufficient resetting.

The resetting is terminated at a timing $t_3$, whereupon the bases and the emitters of the phototransistors $Q_1$, $Q_2$, ... are maintained in the floating state.

When light enters the base, photocarriers are generated and accumulated in the capacitance associated with the base, thereby elevating the base potential. At the same time, the emitter potential is elevated, following the base potential.

Then, at a timing $t_4$, transfer MOS transistors $M_{21}$, $M_{22}$, ... are turned on whereby the increases in the base potentials of the phototransistors $Q_1$, $Q_2$, ... can be read out into the accumulating capacitors $C_1$, $C_2$, ... by the emitter-following operation.

Effects similar to those in the foregoing embodiment can also be obtained with the sensor circuit and the timings of function of the present embodiment.

The present embodiment employs two resetting MOS transistors for each pixel, but similar effects can naturally be obtained by employing three or more resetting MOS transistors.

Embodiment 3

Figure 10:
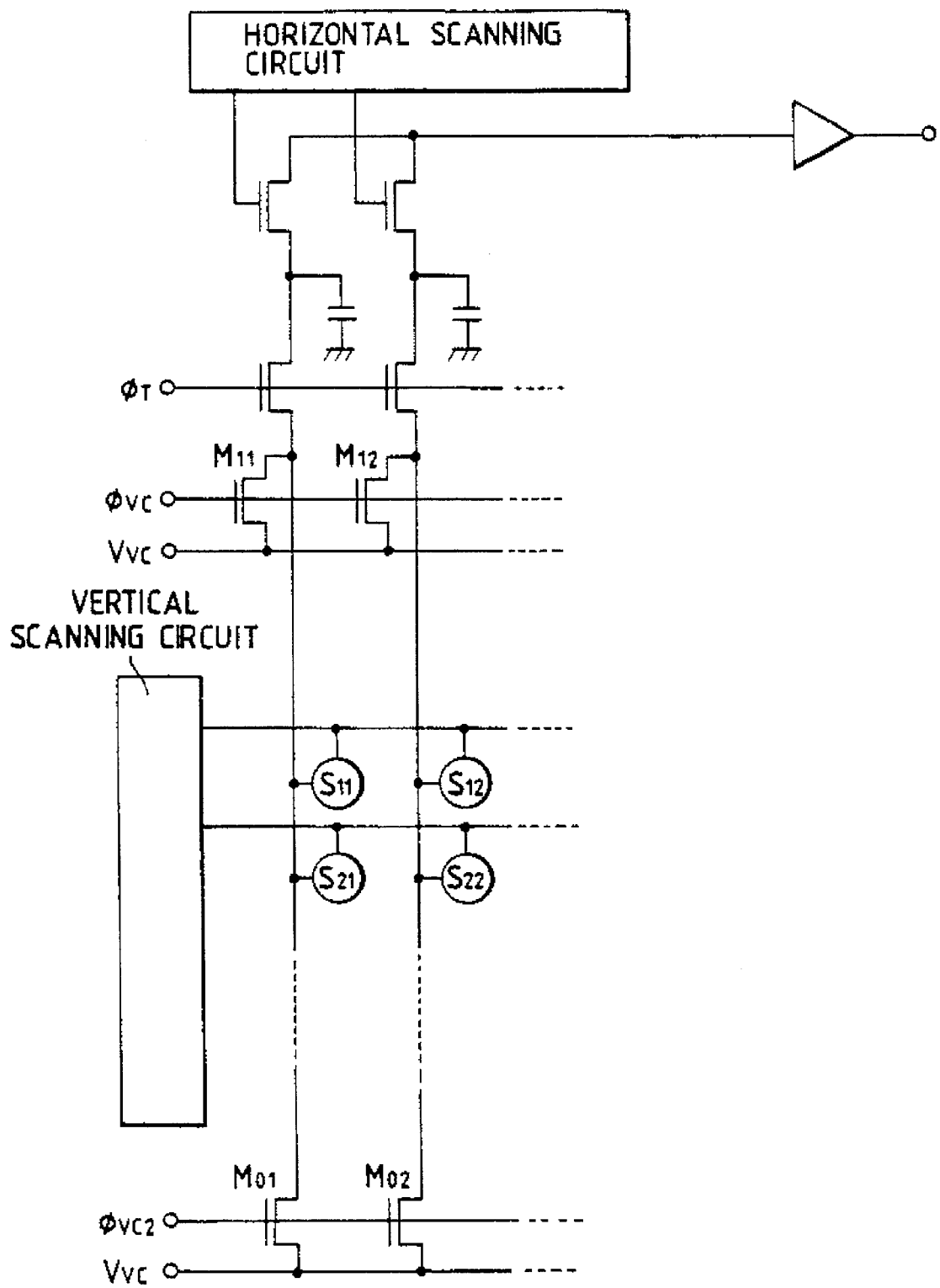
FIG. 10 is a circuit diagram of a device constituting a third embodiment of the present invention.

FIG. 10 shows a third embodiment of the present invention, in which plural resetting MOS transistors are positioned on both sides, on a chip, of an array of pixels, and such configuration provides similar effects to those in the first embodiment. In FIG. 10 there is provided a resetting MOS transistor at each end, but similar effects can naturally be obtained by employing plural resetting MOS transistors.

Also the resetting from both sides of a pixel array prevents the drawback of sloped reset potentials of the pixels, caused by a sloped potential resulting from the resistance in the resetting line.

The timings of driving will not be explained as they are same as those in the foregoing embodiments 1 and 2.

Embodiment 4

Figure 11:
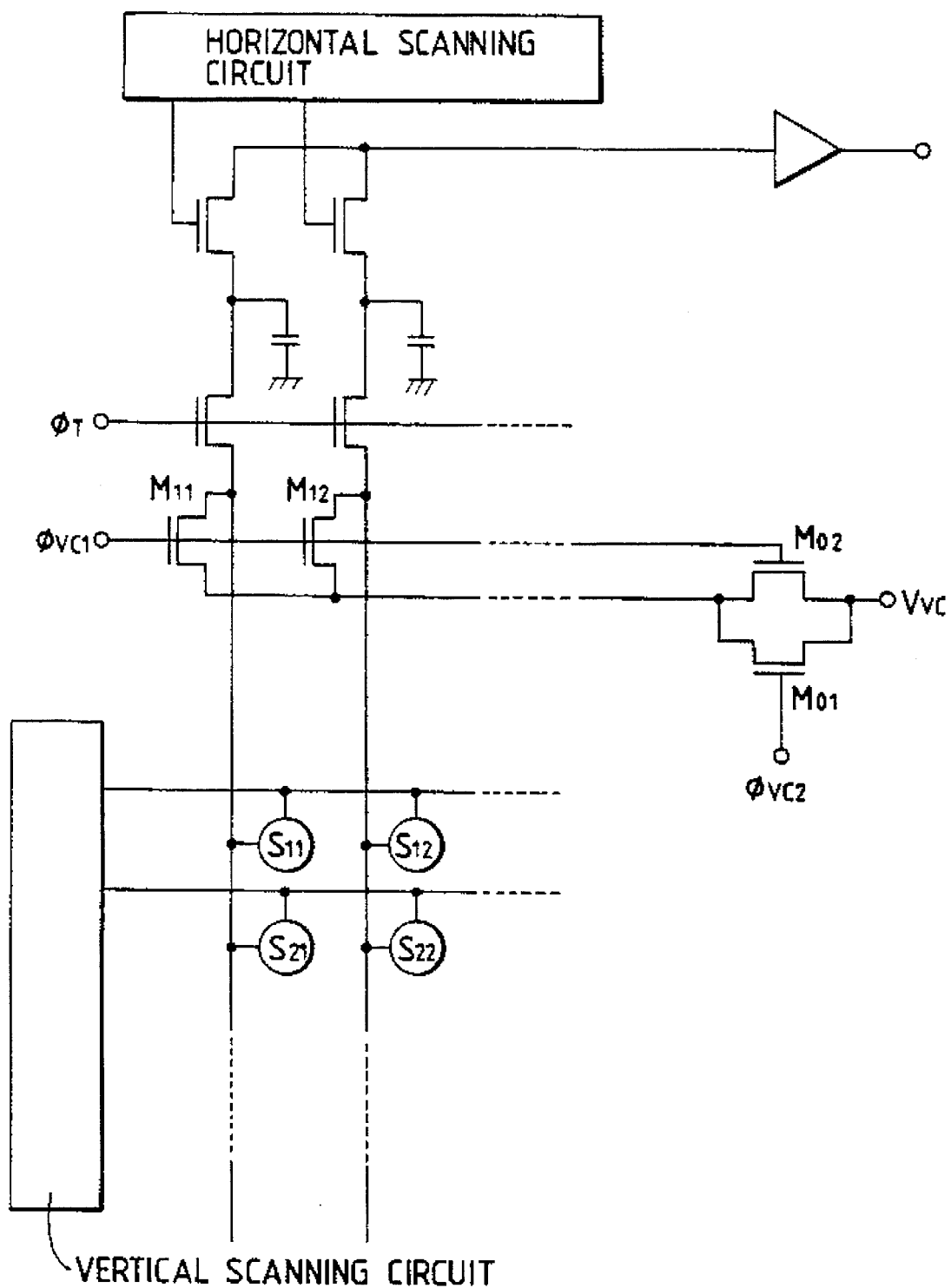
FIG. 11 is a circuit diagram of a device constituting a fourth embodiment of the present invention.

FIG. 11 shows a fourth embodiment of the present invention, in which resetting MOS transistors are provided at the side of the common power source, instead of on each output line, for limiting the current.

Similar effects to those in the first embodiment can be obtained by providing the common power source line with plural resetting MOS transistors and turning on said transistors at mutually different timings. The configuration shown in FIG. 11 employs two MOS transistors, but similar effects can naturally be attained by employing three or more MOS transistors.

Also the present configuration, requiring only one resetting MOS transistor for each pixel array, has an additional advantage of allowing to significantly reduce the number of switch elements, in comparison with the foregoing embodiments. The timings of driving are similar to those in the foregoing embodiments 1, 2 and 3.

Embodiment 5

Figure 12:
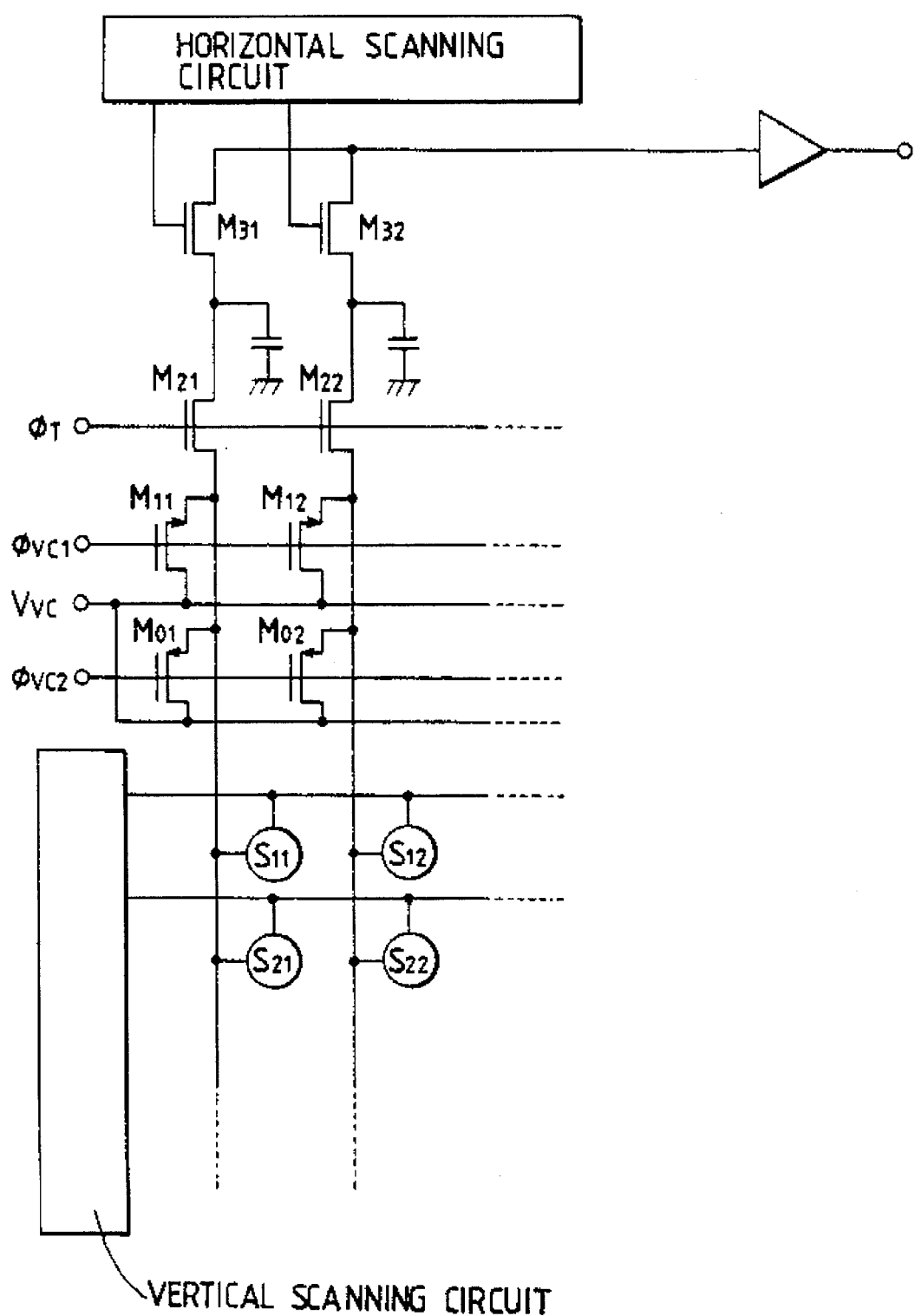
FIG. 12 is a circuit diagram of a device constituting a fifth embodiment of the present invention.
Figure 13:
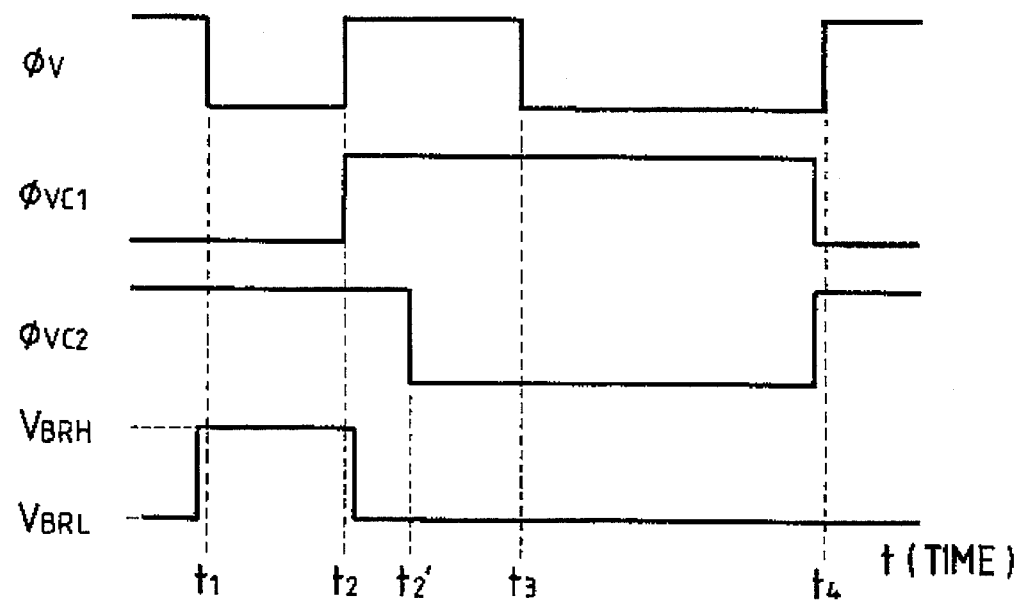
FIG. 13 is a timing chart showing the function of the device of the fifth embodiment.

FIG. 12 is a circuit diagram of a fifth embodiment of the present invention, which is featured by a fact that the plural resetting MOS transistors are composed of a pair of an NMOS transistor and a PMOS transistor, and FIG. 13 is a timing chart showing the functions of said fifth embodiment.

In FIG. 12, the resetting switches $M_{11}$, $M_{12}$, ... are composed of NMOS transistors, while those $M_{01}$, $M_{02}$, ... are composed of PMOS transistors. The clock signal $\phi_{VC2}$ has, as shown in FIG. 13, an inverted phase in comparison with that shown in FIG. 6, for the purpose of driving the PMOS transistors.

The present configuration also provides effects similar to those of the first embodiment. Furthermore, the configuration shown in FIG. 12 employs an NMOS transistor and a PMOS transistor each, but similar effects can be attained by employing plural NMOS transistors and plural PMOS transistors.

Also as shown in FIG. 13, the resetting is started from the NMOS transistor, but similar advantages can be attained by starting the resetting from the PMOS transistor.

Furthermore, by matching the base capacitances of the NMOS transistor and the PMOS transistor, there can be attained an additional advantage of reducing the fluctuations in the base and emitter potentials of the phototransistors, resulting from the turning-off of the resetting MOS transistors at the end of resetting.

As explained in the foregoing embodiments, it is rendered possible to suppress the peak current at the resetting operation, thereby alleviating the load on the external power source, by providing plural resetting switch means and by mutually displacing the timings of closing of said switch means.

Also by providing resetting switch means on both ends of an array of pixels and by effecting the resetting from both ends, it is rendered possible to prevent the drawback of a sloped reset potential of the pixels, caused by a sloped potential resulting from the resistance in the resetting line.

It is furthermore rendered possible to reduce the fluctuation in the base and emitter potentials of the phototransistors, caused by the turning-off of the resetting MOS transistors at the end of resetting, by employing a pair of an NMOS transistor and a PMOS transistor for the resetting switch means and by matching the gate capacitances of said transistors.

It is furthermore rendered possible to reduce the number of switch elements, by providing a common power supply line with plural resetting MOS transistors and by turning on said transistors at mutually different timings.

The above-explained photoelectric converting device can be advantageously employed in an optical information signal processing apparatus such as a facsimile, a video cassette recorder or a copying machine.

Figure 14:
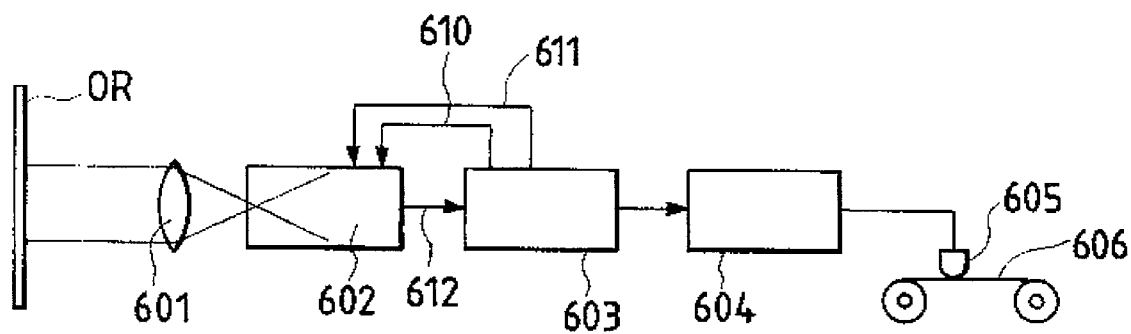
FIG. 14 is a block diagram of an optical information signal processing apparatus, embodying the present invention.

FIG. 14 is a block diagram of such optical information signal processing apparatus, embodying the present invention.

There are shown an original OR bearing image information thereon, an imaging lens 601, and a photoelectric converting device 602 explained above.

A control circuit 603, including a central processing unit, is connected to the photoelectric converting device 602, through an input line 612, a drive line 610 and a power supply line 611.

A recording control circuit 604 is connected with a recording head 605 and serves to record the information on a recording medium 606.

The recording head 605 is an optical head or a magnetic head in case of the video record, or a thermal head or an ink jet head in case of the facsimile apparatus or the like.

The resetting circuit of the present invention explained above is capable of suppressing the peak current value at the resetting operation, and can therefore provide a device of a low electric power consumption.

What is claimed is:

1. A resetting circuit for a device comprising a plurality of cells adapted to be reset, said resetting circuit comprising:

a reference voltage source for providing a reference voltage;

connecting path means for connecting said cells to said reference voltage source for resetting said cells; and altering means for altering during a resetting period an impedance of said connecting path means to an impedance of lower value, said altering means having at least two switches, a timing of each said switch including a period of time in which the switch is turned on, wherein the respective timings of said switches are set so that said on-time periods partially overlap and wherein said two switches are connected in parallel between said reference voltage source and a corresponding cell.

2. An apparatus comprising:

a resetting circuit according to claim 1; and a driving circuit for supplying a drive signal to said resetting circuit.

3. An apparatus according to claim 2, which is an image display apparatus.

4. An apparatus according to claim 2, wherein said cells are composed of transistors, and said resetting circuit is connected to at least one main electrode area of each of said transistors, and wherein the resetting period is conducted by forwardly biasing a junction between a control electrode area and said main electrode area in each of said transistors.

5. A resetting circuit according to claim 1, wherein said altering means comprises switches that during a resetting period, alter a resistance of said connecting path means to a lower value.

6. A resetting circuit according to claim 5, wherein one of said switches turns on and then another switch turns on.

7. A resetting circuit for a device comprising a plurality of cells adapted to be reset, said resetting circuit comprising:

a reference voltage source for providing a reference voltage;

connecting paths for connecting said cells to said reference voltage source for resetting said cells; and altering means for altering during a resetting period a resistance of said connecting paths to a lower resistance value, said altering means having at least two switches, a timing of each said switch including a period of time in which the switch is turned on, wherein the respective timings of said switches are set so that said on-time periods partially overlap and wherein said two switches are connected in parallel between said reference voltage source and a corresponding cell.

8. A resetting circuit according to claim 7, wherein said altering means is composed of plural transistors connected in mutually parallel manner.

9. A resetting circuit according to claim 7, wherein said altering means comprises switches connected in parallel.

10. A resetting circuit according to claim 9, wherein one of said switches turns on and then another switch turns on.

11. A resetting circuit for a device comprising a plurality of cells adapted to be reset, said resetting circuit comprising:

a reference voltage source for providing a reference voltage;

connecting paths for connecting said cells to said reference voltage source for resetting said cells; and an altering circuit for altering during a resetting period an impedance of said connecting paths to an impedance of lower value, said altering circuit having at least two switches, a timing of each said switch including a period of time in which the switch is turned on, wherein the respective timings of said switches are set so that said on-time periods partially overlap and wherein said two switches are connected in parallel between said reference voltage source and a corresponding cell.

12. A resetting circuit for a device comprising a plurality of cells adapted to be reset, said resetting circuit comprising:

a reference voltage source for providing a reference voltage;

connecting paths for connecting said cells to said reference voltage source for resetting said cells; and an altering circuit for altering during a resetting period a resistance of said connecting paths to a lower resistance value, said altering circuit having at least two switches, a timing of each said switch including a period of time in which the switch is turned on, wherein the respective timings of said switches are set so that said on-time periods partially overlap and wherein said two switches are connected in parallel between said reference voltage source and a corresponding cell.

13. A resetting circuit for a device comprising a plurality of cells adapted to be reset, said resetting circuit comprising:

a first switch for connecting said cells to a reference voltage source for providing a reference voltage;

a second switch for connecting said cells to the reference voltage source; and a driving circuit for respectively supplying signals ($\phi_{VC1}$, $\phi_{VC2}$) to said first and second switches so that said first switch turns on for a first turn-on period and then said second switch turns on for a second turn-on period, wherein said first and second turn-on periods partially overlap, wherein said first and second switches are connected in parallel between the reference voltage source and said cells.

* * * * *

UNITED STATES PATENT AND TRADEMARK OFFICE
CERTIFICATE OF CORRECTION

PATENT NO. : 5,585,814

DATED : December 17, 1996

INVENTOR(S) : Isamu Ueno et al.

Page 1 of 2

It is certified that error appears in the above-identified patent and that said Letters Patent is hereby corrected as shown below:

On title page,

AT [56] UNITED STATES PATENT DOCUMENTS
Insert
```
  4,791,469  12/1988  Ohmi et al.
  4,810,896  03/1989  Tanaka et al.
  4,866,293  09/1989  Nakamura et al.
  4,879,470  11/1989  Sugawa et al.
  4,958,085  09/1990  Hashimoto et al.
  4,959,723  09/1990  Hashimoto
  4,962,412  10/1990  Shinohara et al.
  4,972,243  11/1990  Sugawa et al.
  5,162,912  11/1992  Ueno et al.
```

COLUMN 1

Line 61, "30" should read --3,--.

UNITED STATES PATENT AND TRADEMARK OFFICE
CERTIFICATE OF CORRECTION

PATENT NO. : 5,585,814

DATED : December 17, 1996

INVENTOR(S) : Isamu Ueno et al.

Page 2 of 2

It is certified that error appears in the above-identified patent and that said Letters Patent is hereby corrected as shown below:

COLUMN 4
  Line 63, "$t_1$," should read --$t_1$.--.

Signed and Sealed this

Fifteenth Day of July, 1997

Attest:

BRUCE LEHMAN

Attesting Officer

Commissioner of Patents and Trademarks